US008311207B2

(12) United States Patent
Gentile Polese et al.

(10) Patent No.: US 8,311,207 B2
(45) Date of Patent: Nov. 13, 2012

(54) EFFICIENT AND COST-EFFECTIVE DISTRIBUTION CALL ADMISSION CONTROL

(75) Inventors: Luigi Gentile Polese, Thornton, CO (US); Kurt H. Haserodt, Westminster, CO (US); Kenneth Owen Michie, Thornton, CO (US); Chandra Ravipati, Thornton, CO (US); Scott M Woods, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 567 days.

(21) Appl. No.: 12/554,714

(22) Filed: Sep. 4, 2009

(65) Prior Publication Data

US 2010/0278327 A1 Nov. 4, 2010

Related U.S. Application Data

(60) Provisional application No. 61/175,310, filed on May 4, 2009, provisional application No. 61/175,320, filed on May 4, 2009.

(51) Int. Cl.
*H04M 7/00* (2006.01)
*H04J 3/16* (2006.01)
*H04J 3/22* (2006.01)

(52) U.S. Cl. .............. 379/221.07; 379/219; 379/221.04; 370/468

(58) Field of Classification Search ............. 379/221.07, 379/219, 221.04, 221.01, 220.01; 370/392, 370/458, 468, 477
See application file for complete search history.

(56) References Cited

U.S. PATENT DOCUMENTS

| | | | |
|---|---|---|---|
| 6,233,223 B1 | 5/2001 | Sabry et al. | |
| 7,324,552 B1 * | 1/2008 | Galand et al. | 370/468 |
| 2001/0048682 A1 * | 12/2001 | Fichou et al. | 370/392 |
| 2003/0236887 A1 | 12/2003 | Kesselman et al. | |
| 2004/0151166 A1 | 8/2004 | Tsukagoshi et al. | |
| 2005/0188073 A1 | 8/2005 | Nakamichi et al. | |
| 2007/0106774 A1 | 5/2007 | Yokota et al. | |
| 2007/0294410 A1 | 12/2007 | Pandya et al. | |
| 2008/0052387 A1 | 2/2008 | Heinz et al. | |
| 2008/0052393 A1 | 2/2008 | McNaughton et al. | |
| 2009/0070454 A1 | 3/2009 | McKinnon et al. | |
| 2009/0271512 A1 | 10/2009 | Jorgensen | |

(Continued)

FOREIGN PATENT DOCUMENTS

| | | |
|---|---|---|
| EP | 1806875 | 7/2007 |
| EP | 1953994 | 8/2008 |

OTHER PUBLICATIONS

Extended European Search Report for European Patent Application No. 10161659.7, mailed Sep. 16, 2010.

(Continued)

*Primary Examiner* — Thjuan K Addy
(74) *Attorney, Agent, or Firm* — Sheridan Ross P.C.

(57) ABSTRACT

A distributed call control system is provided that can allot bandwidth amongst several call controllers. The distributed call control system includes one or more servers that execute two or more instances of call processing servers that administer call control. The call processing servers form a cluster or group. The cluster members negotiate and determine bandwidth allocation amongst the members. If a member requires more bandwidth, the call processing server, of that member, assesses its own needs and requests more bandwidth from other members. The negotiation and requests for bandwidth are accomplished with a set of dynamic and static bandwidth data that regiment the control of the bandwidth.

20 Claims, 10 Drawing Sheets

U.S. PATENT DOCUMENTS

2010/0074271 A1* 3/2010 Iwamura ................. 370/458
2010/0094986 A1   4/2010 Zuckerman et al.

OTHER PUBLICATIONS

U.S. Appl. No. 12/629,702, filed Jun. 2, 2011, Brunson et al. (Filed Dec. 2, 2009).

Background of the Invention for the above-captioned application (provided Sep. 4, 2009).
Carter et al. "Server Selection Using Dynamic Path Characterization in Wide-Area Networks," INFOCOM '97. Sixteenth Annual Joint Conference of the IEEE Computer and Communications Societies. Driving the Information Revolution Apr. 7, 1997, vol. 3, pp. 1014-1021.

* cited by examiner

EFFICIENT AND COST-EFFECTIVE DISTRIBUTION CALL ADMISSION CONTROL

CROSS REFERENCE TO RELATED APPLICATIONS

Priority is claimed from U.S. Provisional Patent Application No. 61/175,310, filed on May 4, 2009 and 61/175,320, filed on May 4, 2009, both of which are incorporated by reference herein in their entirety for all that they teach.

BACKGROUND

An enterprise call system (e.g., a phone system used by a business or other entity) or a call center can generally receive thousands of calls within a given day. The calls may be received at various locations. Every call requires a certain amount of bandwidth from the network that carries the call. Unfortunately, network bandwidth is limited. As such, with each call, a system in the network must determine whether there is enough unused bandwidth to handle each call. Generally, a central system maintains a calculation for the amount of bandwidth available. As each call controller receives a request for a new call, the call controller asks the central system if there is enough bandwidth to proceed with the phone call. Unfortunately, as the network becomes more diverse with several call controllers, the process of requesting bandwidth from the central system becomes inefficient and creates added network traffic.

SUMMARY

It is with respect to the above issues and other problems that the embodiments presented herein were contemplated. Herein, a distributed call control system is provided that can allot bandwidth amongst several call controllers. Embodiments of the distributed call control system include one or more servers that execute two or more instances of call processing servers that administer call control. The call processing servers form a cluster or group. Rather than a central system controlling bandwidth allocation, the cluster negotiates and determines bandwidth allocation amongst the members. If a member requires more bandwidth, the call processing server assesses its own needs and requests more bandwidth from other members. The negotiation and requests for bandwidth are accomplished with a set of dynamic and static bandwidth data that regiment the control of the bandwidth. Exemplary applications for the embodiments include supporting an enterprise call center structure or supporting large phone traffic management systems. Other applications will be readily apparent to one of ordinary skill in the art.

The embodiments can have a number of advantages. For example, this design dynamically manages call bandwidth across multiple call processing server instances, according to the individual call processing server instance traffic characteristics. "Dynamic" means that if a particular call processing server instance is incurring a period of high-bandwidth use that is limiting its ability to allow calls to go through, that instance can obtain more bandwidth allowing the instance to allow more calls. The obtained bandwidth should be ideally sufficient for the call processing server instance to reach a bandwidth level that would allow the instance to operate for some time, in order to avoid too frequent bandwidth requests. Also, in order to minimize call denials as much as possible, the bandwidth request should be issued possibly before a bandwidth exhaustion condition occurs (predictive approach).

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It being understood that various changes may be made in the function and arrangement of elements without departing from the spirit and scope of the invention as set forth in the appended claims.

Figure 1:
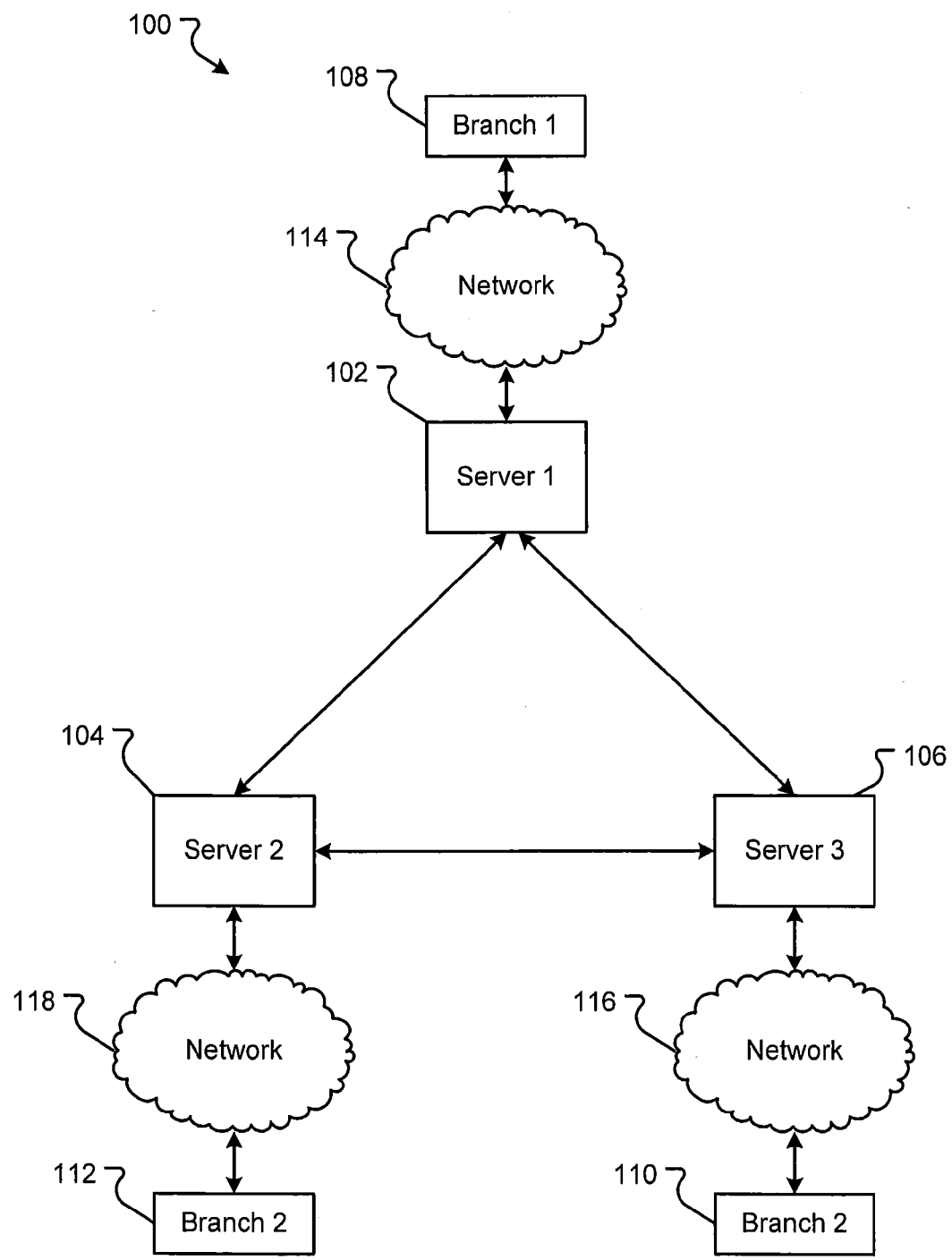
FIG. 1 is a block diagram of an embodiment of a distributed calling system that can distribute network bandwidth amongst the calling servers.

An embodiment of a system 100 for administering phone calls is shown in FIG. 1. The several components of the system 100 may be hardware, software, or a combination of hardware and software. Descriptions of the computer system environment and the computer systems which may embody the several components of system 100 are described in conjunction with FIGS. 9 and 10. As such, a functional description of the several components of system 100 shall follow.

In embodiments, the system comprises two or more servers 102, 104, and/or 106 operable to administer calls and in communication through network 114. Each server 102, 104, and/or 106 may manage the phone calls for a branch 108, 110, and/or 112 through a network 114, 116, and/or 118. A branch 108, 110, and/or 112 may include a set of multiple communication devices, such as telephones. For example, a branch may be part of a call center or site of an enterprise network. Typically, the branches 108, 110, and/or 112 are a collection of Internet Protocol (IP) addresses and/or telephone numbers. The networks 114, 116, and/or 118 can be any trusted or untrusted network as discussed in conjunction with FIGS. 9 and 10 that allow for the communication of data between the branches 108, 110, and/or 112 and the servers 102, 104, and/or 106.

The system 100 manages phone calls or requests for bandwidth from one or more IP addresses at one or more branches. As an example, a phone call may be requested from a branch 108. The request may be sent to the server 102 over the network 114. Before allowing the call, the server 114 must determine if the network 114 has enough bandwidth. Generally, the networks 114, 116, and/or 118 and the communications between servers 102, 104, and/or 106 is bandwidth limited. As such, the group of servers 102, 104, and/or 106 must share the bandwidth. Thus, the server A 102 must be able to determine if the phone call will have enough bandwidth in the system 100.

The servers 102, 104, and/or 106 are part of a group in which the servers 102, 104, and/or 106 share the available bandwidth. To share the bandwidth, the servers 102, 104, and/or 106 allot each server 102, 104, and/or 106 an amount of bandwidth. As each server 102, 104, and/or 106 administers or controls a call, a portion of the allotted bandwidth is employed. However, in some situations, the server 102, 104, and/or 106 requires more bandwidth to administer a call. The server 102, 104, and/or 106 can, in these situations, request more bandwidth from the other members of the group.

Figure 2:
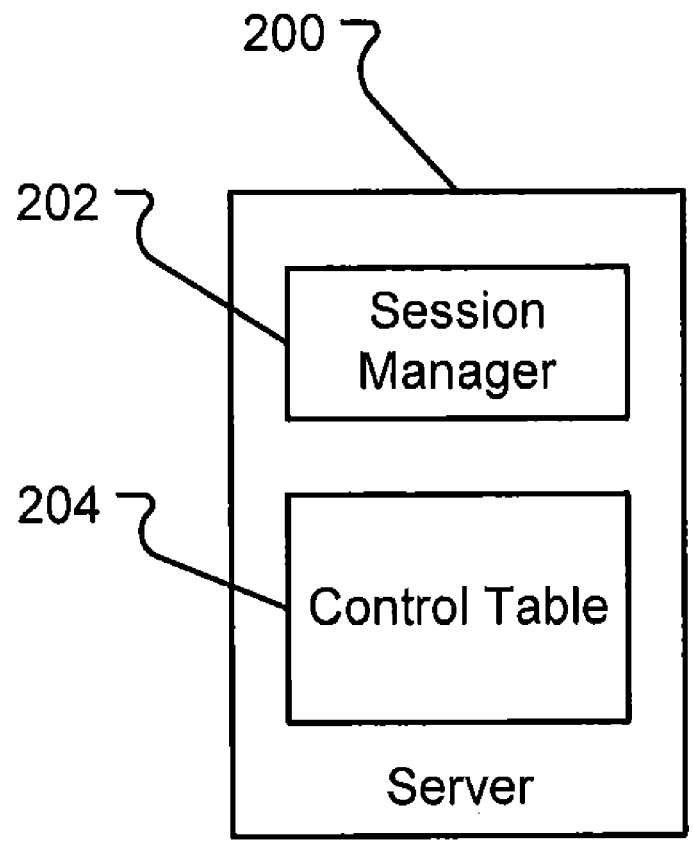
FIG. 2 is a block diagram of an embodiment of a calling server.

An embodiment of a server 200 is shown in FIG. 2. The server 200 can be the same as or similar to servers 102, 104, and/or 106 (FIG. 1). In embodiments, the server 200 is a computer system as described in conjunction with FIG. 7. The server 200 can have one or more components, which may execute as computer modules. The server 200 can include one or more of, but is not limited to, a call processing server 202 and/or a control table 204.

The call processing server 202 administers or control calls for the server. The call processing server 202 receives requests for phone calls from an IP address of a member of the branch 108, 110, and/or 112 (FIG. 1). The call processing server 202 may route the call as required to complete the call. However, in embodiments, the call processing server 202 determines if the call has adequate bandwidth. If more bandwidth is required, the call processing server requests additional bandwidth. In some embodiments, the call processing server may also function as a group administrator as explained hereinafter.

Figure 3:
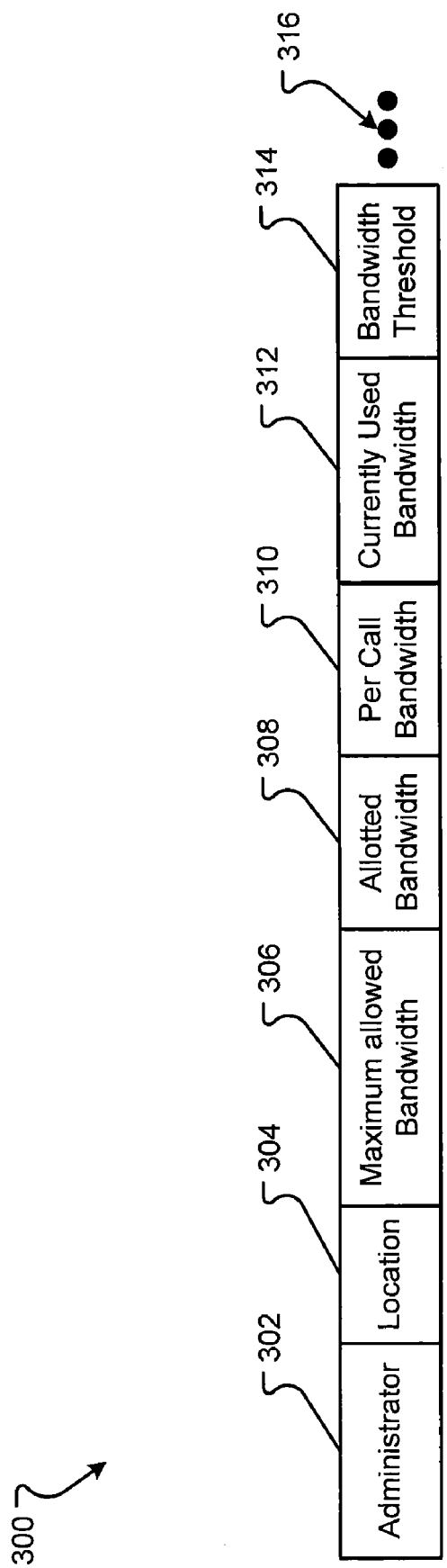
FIG. 3 is a block diagram of a data structure that is stored, sent, or received by one or more calling servers for distributing and requesting bandwidth.

The control table 204 can store control information that allows the call processing server 202 to determine if enough bandwidth is available and whether to contact a group member for more bandwidth. An embodiment of the control table is shown in FIG. 3. Generally, every server 102, 104, and/or 106 includes a control table 204. The call processing server 202 and control table 204 allows each member server 102, 104, and/or 106 to separately manage bandwidth requirements without a central system.

An embodiment of a data structure 300 embodying control information that may be included in a control table 204 (FIG. 2) is shown in FIG. 3. The control information 300 can be composed of two or more data fields 302, 304, 306, 308, 310, 312, and/or 314. There may be more or fewer portions than those shown in FIG. 3, as represented by ellipses 316. Some of the control information 300 may be static having a stable value. However, other control information 300 is dynamic and changes. The dynamic information may be computed periodically (for example, every day, every hour, etc.) or may be computed in response to an event (for example, a new call is received, a new member joins the server group, etc.).

The administrator field 302 contains a bit or other indication that the server 102, 104, or 106 is the administrator for the members of the server group. The administrator is determined after initial establishment of the server group or after some event (for example, a network outage, server failure, etc.) that requires the reestablishment of the server group. An administrator helps determine the initial allotment of bandwidth to the group members and conducts periodic audits of the server group as explained hereinafter. The location field 304 includes an identification of the location of server 102, 104, and/or 106 (FIG. 1) or the branch 108, 110, and/or 112 (FIG. 1) administered by the server 102, 104, and/or 106 (FIG. 1). The location field 304 can identify the server 102, 104, and/or 106 (FIG. 1) to the administrator or to another server. The maximum allowed bandwidth field 306 stores the bandwidth available to the entire system 100 (FIG. 1). The maximum allowed bandwidth 306 can be used to determine allotments to the servers 102, 104, and/or 106 or to audit the bandwidth used by the system 100 (FIG. 1). Generally, the administrator maintains the maximum allowed bandwidth 306 for the servers 102, 104, and/or 106. After the server group is established, the administrator field 302, the location field 304, and the maximum allowed bandwidth 306 are static unless an event (e.g., a server failure, etc) changes the server group.

The allotted bandwidth field 308 stores the current bandwidth value allotted to the server 102, 104, and/or 106. Per call bandwidth 310 is the amount of bandwidth needed for each call. The per call bandwidth 310 can include an average amount of bandwidth used per call or denote the highest historical bandwidth needed for a call. The currently used bandwidth field 312 stores a measure of that amount of bandwidth being used by the server 102, 104, and/or 106 (FIG. 1) to conduct all the calls currently administered by the server 102, 104, and/or 106 (FIG. 1). As calls are started or completed, the currently used bandwidth 312 changes. A bandwidth threshold 314 can be a level of bandwidth at which the server 102, 104, and/or 106 (FIG. 1) will need to request more bandwidth. For example, the bandwidth threshold 314 may be 80% of the allotted bandwidth 308. If the currently used bandwidth 312 exceeds the bandwidth threshold 314, the server 102, 104, and/or 106 (FIG. 1) would need to request more bandwidth. Other values, measurements, and calculation results may be stored in the control information 300 as provided below.

Figure 4:
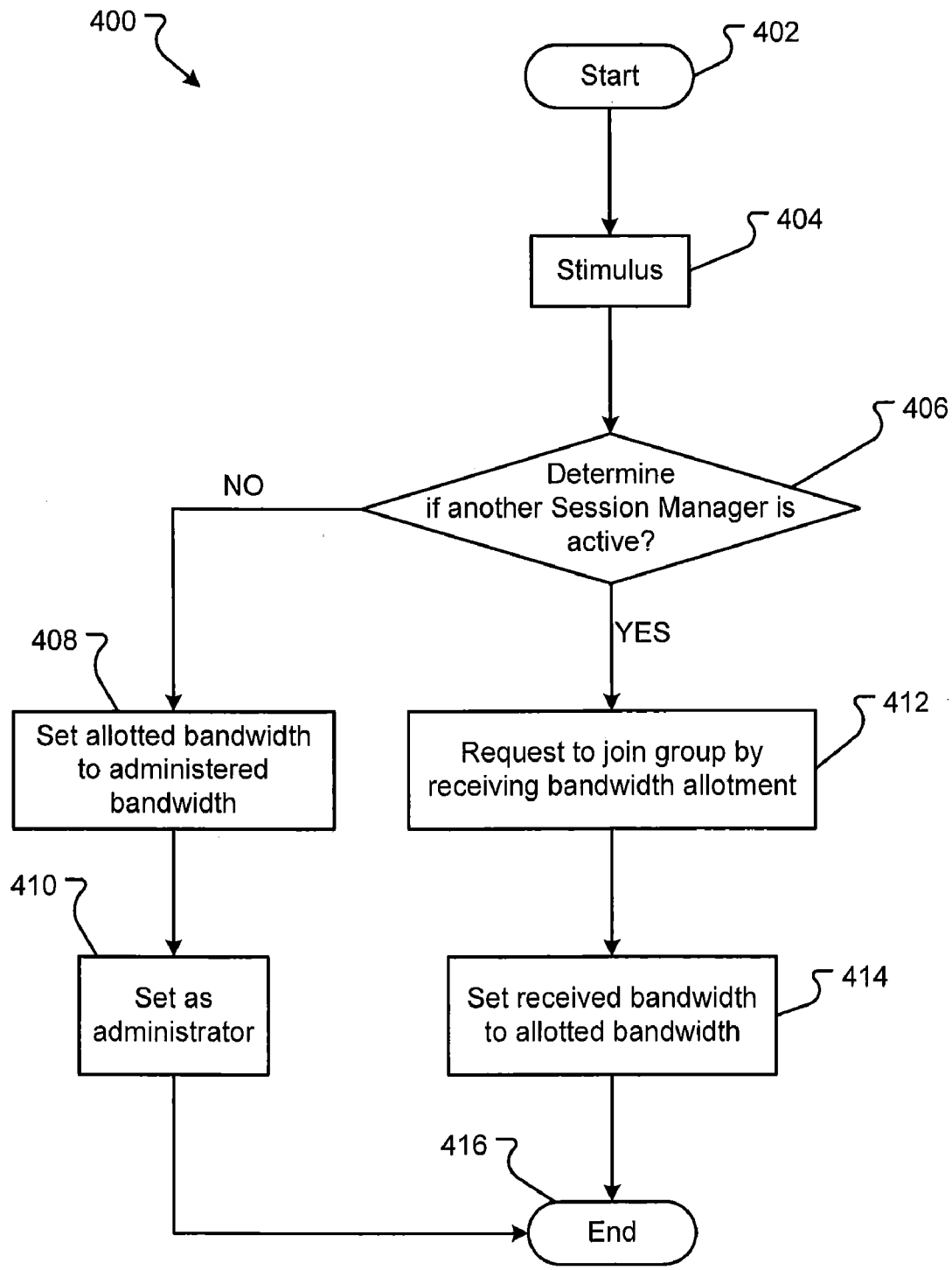
FIG. 4 is a flow diagram of an embodiment of a process for a server to initiate and determine an initial bandwidth allocation.

An embodiment of a method 400, from the perspective of the requesting server, for initially allotting bandwidth is shown in FIG. 4. Generally, the method 400 begins with a start operation 402 and terminates with an end operation 416. While a general order for the steps of the method 400 are shown in FIG. 4, the method 400 can include more or fewer steps or arrange the order of the steps differently than those shown in FIG. 4. The method 400 can be executed as a set of computer-executable instructions executed by a computer system and encoded or stored on a computer readable medium. Hereinafter, the method 400 shall be explained with reference to the systems, components, modules, data structures, etc. described in conjunction with FIGS. 1-3. Further, the requesting server shall be delineated as server 102 and the providing server shall be delineated as server 104. It should be noted that any server 102, 104, and/or 106 may function either as the requesting server or the providing server The requesting server 102 receives a stimulus in step 404. A stimulus may be the initial creation of the server group or a recovery from a failure event (e.g., a network outage). A requesting server 102 may restart or initialize in response to the stimulus. Upon initialization, the requesting server 102 will attempt to join the server group. The requesting server 102 determines if another call processing server 202 is active in step 406. To accomplish the determination, the requesting server 102 can search the control table 204 for location information 304 or other identifying information for other possible server group members. The requesting server 102 generates an inquiry to the other group members to determine if at least one group member is active. If one of the group members is active, the call processing server 202 of the providing server 104 can send a response back in reply to the inquiry. If there is another call processing server 202 active, the method 400 flows YES to the request step 412. If there is no other call processing server 202 active, the method flows NO to set step.

The call processing server 202 of the requesting server 102 sets the allotted bandwidth 308 to the received bandwidth, which is the maximum allowed bandwidth for the server group, in step 408. In other words, if there is no other call processing server 202 active, as determined in step 406, the call processing server 202 can use all the bandwidth for the server group. Further, the call processing server 202 can set the administrator bit 302 to become the administrator for the group. Thus, in embodiments, the first active call processing server 202 becomes the administrator. In other embodiments, the administrator may be chosen by a voting, or delegation process.

If another call processing server 202 is active, the call processing server 202 of the requesting server 102 may send a request to at least one other server 102, 104, and/or 106 for a bandwidth allotment. During the inquiry process, an already active call processing server 202 of the providing server 104 can identify itself to newly joining group members as the administrator 104. The administrator 104 may receive bandwidth requests from two or more joining servers 102 and/or 106. In response to the requests, the administrator 104 may allot a share of the administered or maximum bandwidth to each of the joining members. The share may be computed in several ways, but, generally, the administrator 104 gives each joining server 102 and/or 106 an equal share of the bandwidth. The requesting server 102 sets the allotted bandwidth 308 to the amount of bandwidth received in step 414.

Figure 5:
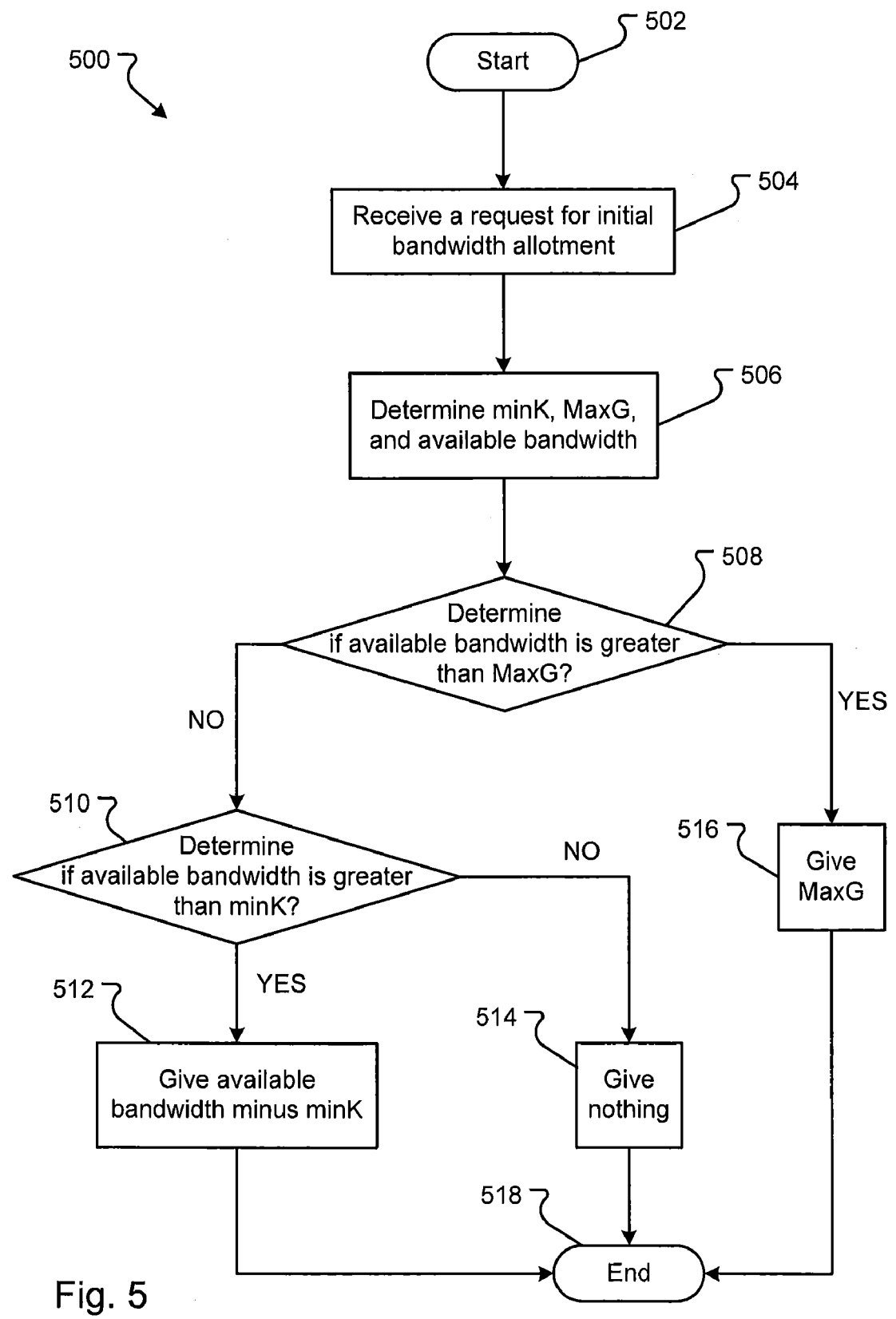
FIG. 5 is a flow diagram of an embodiment of a process for a server to administer an initial allotment of bandwidth to a requesting server.

An embodiment of a method 500, from the perspective of the bandwidth providing server, for providing bandwidth to a requesting server is shown in FIG. 5. Generally, the method 500 begins with a start operation 502 and terminates with an end operation 518. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, data structures, etc. described in conjunction with FIGS. 1-3. Further, the requesting server shall be delineated as server 102 and the providing server shall be delineated as server 104. It should be noted that any server 102, 104, and/or 106 may function either as the requesting server or the providing server.

The providing server 104 receives a request from a requesting server 102 for bandwidth. The bandwidth request may ask for an initial allotment (that is, the requesting server 102 needs a first allotment rather than an increase in the existing allotment). Thus, the providing server 104 can try to give as much bandwidth as possible to the requesting server rather than a set amount. The providing server 104 determines the minimum bandwidth the server needs to keep (minK), the maximum bandwidth to give (MaxG), and the available bandwidth in step 506. MinK is the maximum of the used bandwidth 312, the low bandwidth threshold 314, or the per call bandwidth 310. MaxG is the amount of administered bandwidth 306 divided by the number of servers 102, 104, and/or 106 in the group (e.g. 60,000 MBps/6 servers=10,000 MBps per server). Available bandwidth is the result of allotted bandwidth 308 minus used bandwidth 312.

The providing server 104 then determines if the available bandwidth is greater than MaxG in step 208. In other words, does the providing server 104 have more bandwidth available than the maximum amount each server in the group should be allotted. If available bandwidth is greater than MaxG, the method 500 flows YES where the providing server 104 provides MaxG to the requesting server 102 in step 516. If available bandwidth is not greater than MaxG, the method 500 flows NO to step 510.

The providing server 104 can determine if the available bandwidth is greater than minK in step 510. In other words, does the providing server 104 have any available bandwidth above the providing server's 104 current needs? If the available bandwidth is greater than minK, the method 500 flows YES to where the providing server 104 provides bandwidth equal to the result of the available bandwidth minus minK in step 512. In other words, the providing server 104 gives the requesting server 102 what bandwidth the providing server 104 has above its needs. If the available bandwidth is not greater than minK, the method 500 flows NO to where the providing server 104 gives nothing to the requesting server 102. Thus, the providing server 104 may give nothing if it only has enough bandwidth to meet its needs.

Figure 6:
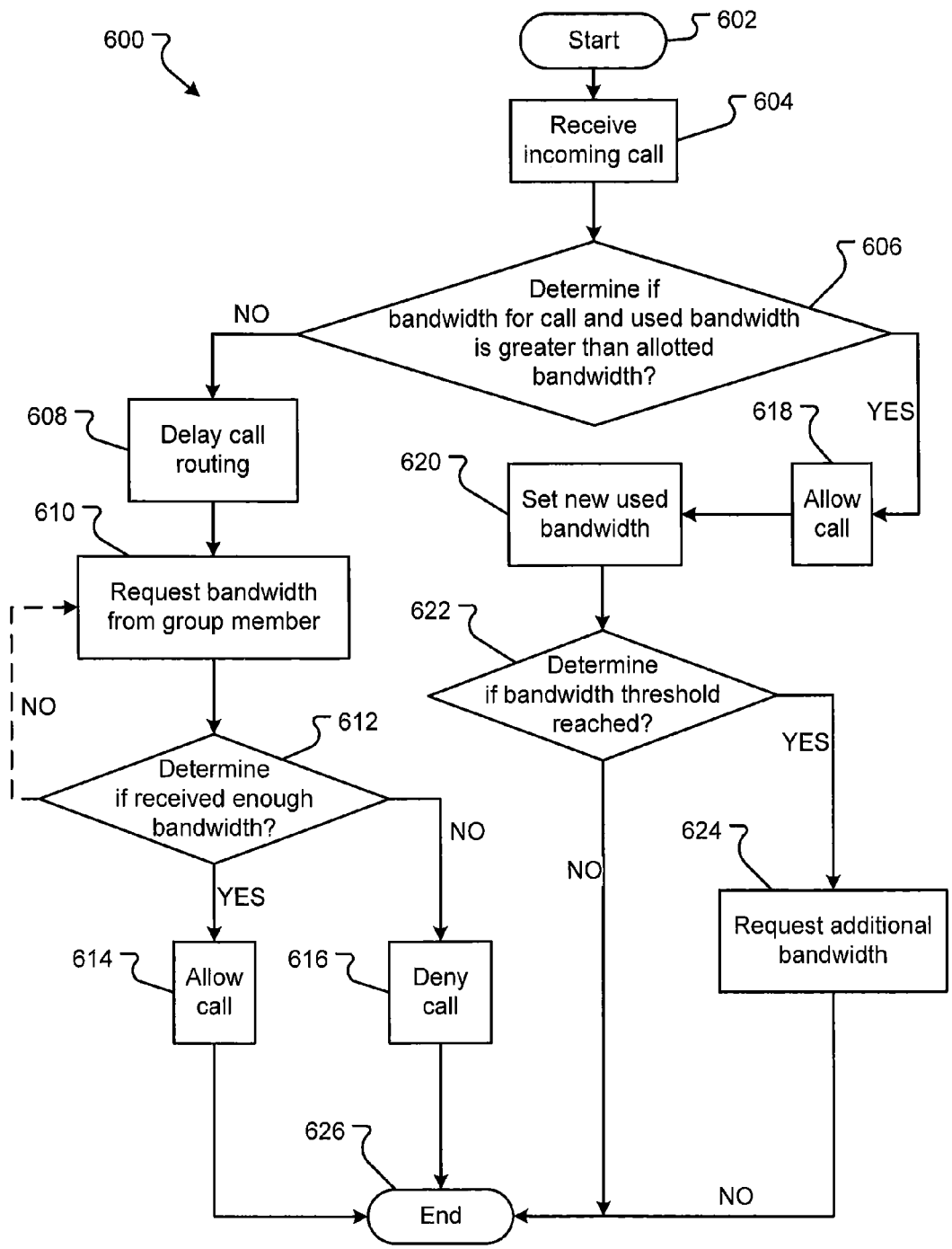
FIG. 6 is a flow diagram of an embodiment of a process for a requesting server determining if more bandwidth is necessary and requesting the needed bandwidth.

An embodiment of a method 600, viewed from the perspective of a requesting server 102, for administering a call is shown in FIG. 6. Generally, the method 600 begins with a start operation 602 and terminates with an end operation 626. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, data structures, etc. described in conjunction with FIGS. 1-3. Further, the requesting server shall be delineated as server 102 and the providing server shall be delineated as server 104. It should be noted that any server 102, 104, and/or 106 may function either as the requesting server or the providing server The call processing server 202 of the requesting server 102 receives an incoming call from the branch 108 in step 604. Before accepting and routing the call, the call processing server 202 determines if the server 102 has enough bandwidth to complete the call in step 606. The call processing server 202 can determine if the used bandwidth 312 plus the bandwidth for the new call 310 is less than the allotted bandwidth 308. If the server 102 has enough bandwidth, the method 600 flows YES where the call processing server 202 allows the call in step 618. If the server 102 does not have enough bandwidth, the method flows NO where the call processing server 202 delays the call routing in step 608.

After delaying the call routing in step 608, the call processing server 202 requests bandwidth from a server group member, such as the providing server 104. The request can be a message indicating a request for bandwidth and a value for the amount of bandwidth needed. After receiving a response from the providing server 104, the call processing server 202 can determine if enough bandwidth was received in step 612. The response may deny the provision of bandwidth. In other situations, the response includes some or all of the bandwidth requested. In one embodiment, if the call processing server 202 does not receive the full amount of bandwidth requested from the providing server 104, the method can flow NO where the call processing server 202 denies the call in step 616. Optionally, if the call processing server 202 does not receive the full amount of bandwidth requested from the providing server 104, the method can flow NO where the call processing server 202 repeats the request step 610 with another server 106 until all the servers are queried a predetermined number of times. If the call processing server 202 receives the full amount of bandwidth requested from the providing server 104 and/or another server, the method flows YES where the call processing server 202 allows the call in step 614.

After allowing a call in step 618, the call processing server 202 sets a new used bandwidth value 312 in step 620. The new used bandwidth value 312 includes the previously allowed calls and the new call just allowed. The call processing server 202 then determines if the new used bandwidth 312 is at or above the low bandwidth threshold 314. Generally, the low bandwidth threshold 314 is a value less than the allotted bandwidth (e.g., 80% of allotted bandwidth) that ensures the call processing server 202 will request more bandwidth before a shortage of bandwidth becomes problematic. If the new used bandwidth 312 is at or above the low bandwidth threshold 314, the method flows YES where the call processing server 202 requests more bandwidth in step 624. The request for additional bandwidth is accomplished similarly to steps 610 and 612. If the new used bandwidth 312 is not at or above the low bandwidth threshold 314, the method flows NO to end operation 626.

Figure 7:
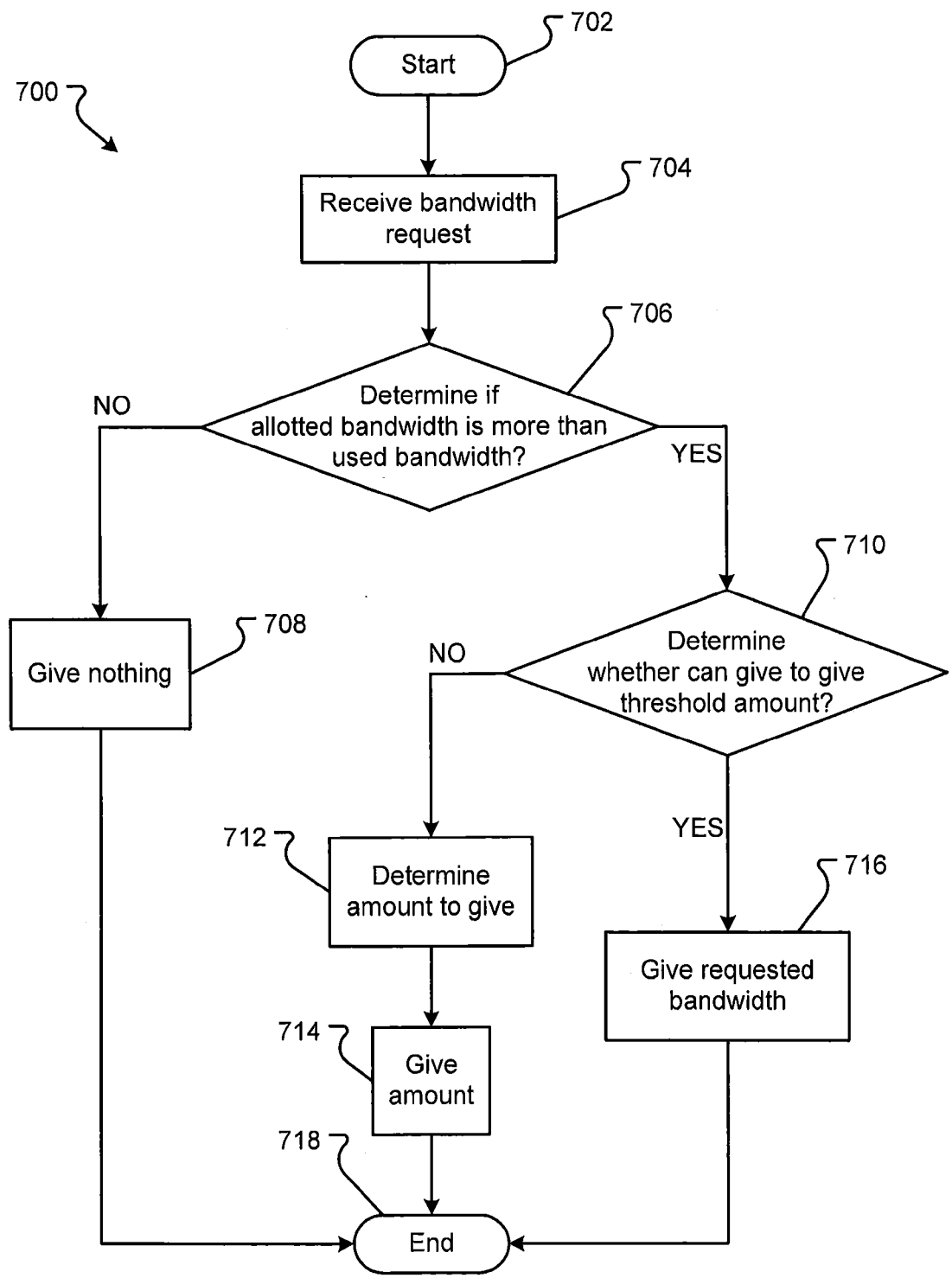
FIG. 7 is a flow diagram of an embodiment of a process for a providing server to respond to a request for additional bandwidth.

An embodiment of a method 700, viewed from the perspective of a providing server 104, for responding to a request for bandwidth is shown in FIG. 7. Generally, the method 700 begins with a start operation 702 and terminates with an end operation 718. While a general order for the steps of the method 700 are shown in FIG. 7, the method 700 can include more or fewer steps or arrange the order of the steps differently than those shown in FIG. 7. The method 700 can be executed as a set of computer-executable instructions executed by a computer system and encoded or stored on a computer readable medium. Hereinafter, the method 700 shall be explained with reference to the systems, components, modules, data structures, etc. described in conjunction with FIGS. 1-3. Further, the requesting server shall be delineated as server 102 and the providing server shall be delineated as server 104. It should be noted that any server 102, 104, and/or 106 may function either as the requesting server or the providing server.

The providing server 104 receives a bandwidth request from a requesting server 102 in step 704. The request can identify the requesting server 102 and the amount of bandwidth needed. The call processing server 202 of the providing server 104 may then determine if the server's allotted bandwidth 308 is greater than the server's used bandwidth 312 in step 706. In other words, the call processing server 202 determines if the providing server 104 has any spare bandwidth. If the server's allotted bandwidth 308 is greater than the server's used bandwidth 312, the method 700 flows YES to step 710. However, if the server's allotted bandwidth 308 is not greater than the server's used bandwidth 312, the method 700 flows NO where the call processing server 202 denies the request and provides no bandwidth to the requesting server 102 in step 708. The call processing server 202 can send a denial response to the requesting server 102.

The call processing server 202 may then determine whether the amount available is less than the give threshold in step 710. The give threshold may be a data field of the control data 300 that sets percentage amount of the allotted bandwidth 308 up to which the call processing server 202 can give away bandwidth (for example, the call processing server 202 may give bandwidth up to a level of 98% of the allotted bandwidth 308, which equals an amount defined by 0.98 times the allotted bandwidth). Thus, the call processing server 202 determines if the allotted bandwidth 308 minus the amount requested is less than the give threshold. If the amount available is less than the give threshold, the method 700 flows YES where the call processing server 202 gives the total amount of requested bandwidth to the requesting server 102 in step 716. If the amount available is not less than the give threshold, the method 700 flows NO to determine operation 712.

To determine the amount to give in step 712, the call processing server 202 can determine if the allotted bandwidth 308 minus the used bandwidth 312 is greater than the average per call bandwidth 310. If the allotted bandwidth 308 minus the used bandwidth 312 is greater than the average per call bandwidth 310, the call processing server 202 determines to give an amount of bandwidth equal to the result of the allotted bandwidth 308 minus the used bandwidth 312 in step 714. However, if the allotted bandwidth 308 minus the used bandwidth 312 is more than the average per call bandwidth 310, the call processing server 202 may give the average per call bandwidth 310 in step 714.

Figure 8:
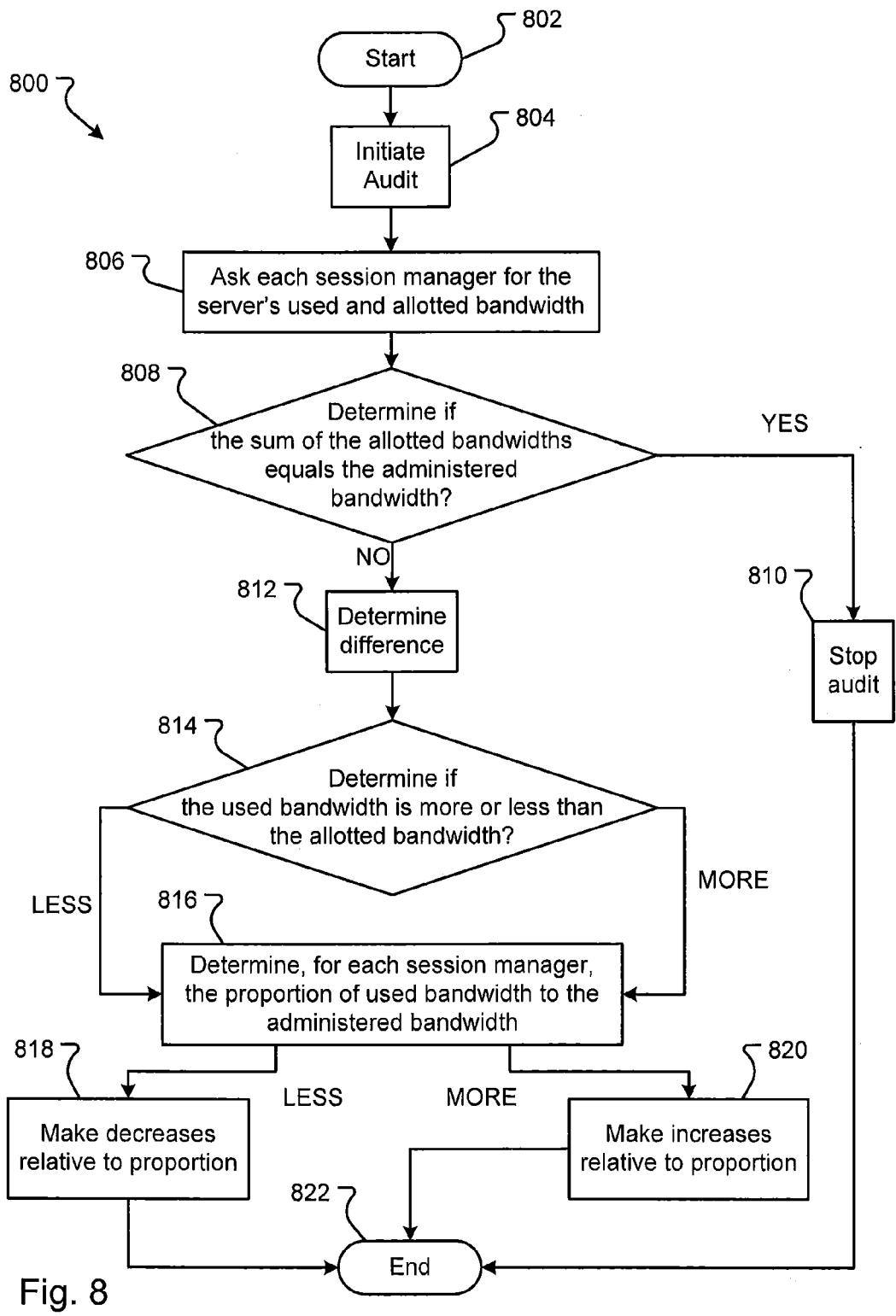
FIG. 8 is a flow diagram of an embodiment of a process for auditing the bandwidth usage for the members of the server group.

An embodiment of a method 800, viewed from the perspective of an administrator server, for conducting an audit of bandwidth usage is shown in FIG. 8. Generally, the method 800 begins with a start operation 802 and terminates with an end operation 822. While a general order for the steps of the method 800 are shown in FIG. 8, the method 800 can include more or fewer steps or arrange the order of the steps differently than those shown in FIG. 8. The method 800 can be executed as a set of computer-executable instructions executed by a computer system and encoded or stored on a computer readable medium. Hereinafter, the method 800 shall be explained with reference to the systems, components, modules, data structures, etc. described in conjunction with FIGS. 1-3. Further, the administrator server shall be delineated as server 102. It should be noted that any server 102, 104, and/or 106 may function as the administrator if so designated.

An administrator server 102 initiates an audit in step 804. The audit may be initiated periodically, for example, every day, every hour, etc., or may be conducted in response to some event, for example, a server being denied bandwidth. The server 102 designated as the administrator begins and conducts the audit. In response to initiating the audit, the administrator server 102 sends a request to each call processing server 202 requesting the server's used and allotted bandwidth in step 806. Each call processing server 202 may send a response with the allotted bandwidth 308 and the used bandwidth 312.

The administrator server 102 then determines if there is bandwidth that is not allotted in step 808. First, the administrator server 102 sums all the responses for the allotted bandwidths. Then, the administrator server 102 compares the sum for the allotted bandwidths to the amount of bandwidth administered for all the call processing servers. If the sum of the allotted bandwidths equals the administered bandwidths, the method 800 flows YES where the administrator server 102 stops the audit in step 810. However, if the sum of the allotted bandwidths does not equal the administered bandwidth, the method 800 flows NO to step 814.

The administrator server 102 may then determine if the used bandwidth for each server is less than the allotted or maximum allowed bandwidth 306 in step 814. If the used bandwidth is less than the maximum allowed bandwidth 306, the method 800 flows YES to step 818. If the sum of used bandwidth is not less than the maximum allowed bandwidth 306, the method 800 flows NO to step 820. The administrator server 102 determines a new proportion of the allotted bandwidth for each call processing server 202 in step 816. Here, the administrator server 102 determines the proportion of bandwidth each call processing server 202 is using by comparing the used bandwidth for the call processing server 202 to the allotted bandwidth for the call processing servers 202. After determining the amount of excess bandwidth for one or more call processing servers 202, the administrator server 102 can determine where to redistribute the excess bandwidth. Thus, the administrator server 102 determines which call processing servers 202 could use more bandwidth, that is, the call processing server 202 has a used bandwidth equal to or nearly equal to the allotted bandwidth for that call processing server 202. The excess bandwidth can be given to those call processing servers 202 with used bandwidths that are equal to or nearly equal to the allotted bandwidth. In this way, the call processing servers 202 with higher usage receive more bandwidth. In another embodiment, the administrator server 102 simply divides the administered bandwidth 306 by the number of call processing servers 202 to distribute the bandwidth equally.

If the used bandwidth was less than the maximum allowed bandwidth 306 for the call process server 202 as determined in step 816, the method 800 flows YES to step 818. In step 818, the administrator server 102 decreases the call processing server's allotted bandwidth to reallocate the unused bandwidth as determined in step 816. If the used bandwidth was not less than the maximum allowed bandwidth 306 for the call process server 202 as determined in step 814, the method 800 flows NO to where administrator server 102 allocates some or all of the excess bandwidth to the call processing server's allotted bandwidth as determined in step 816. To decrease or increase the allotted bandwidth, the administrator server 102 simply sends each call processing server a new allotted bandwidth 308 to be stored in the control table 204 in steps 818 and 820.

Figure 9:
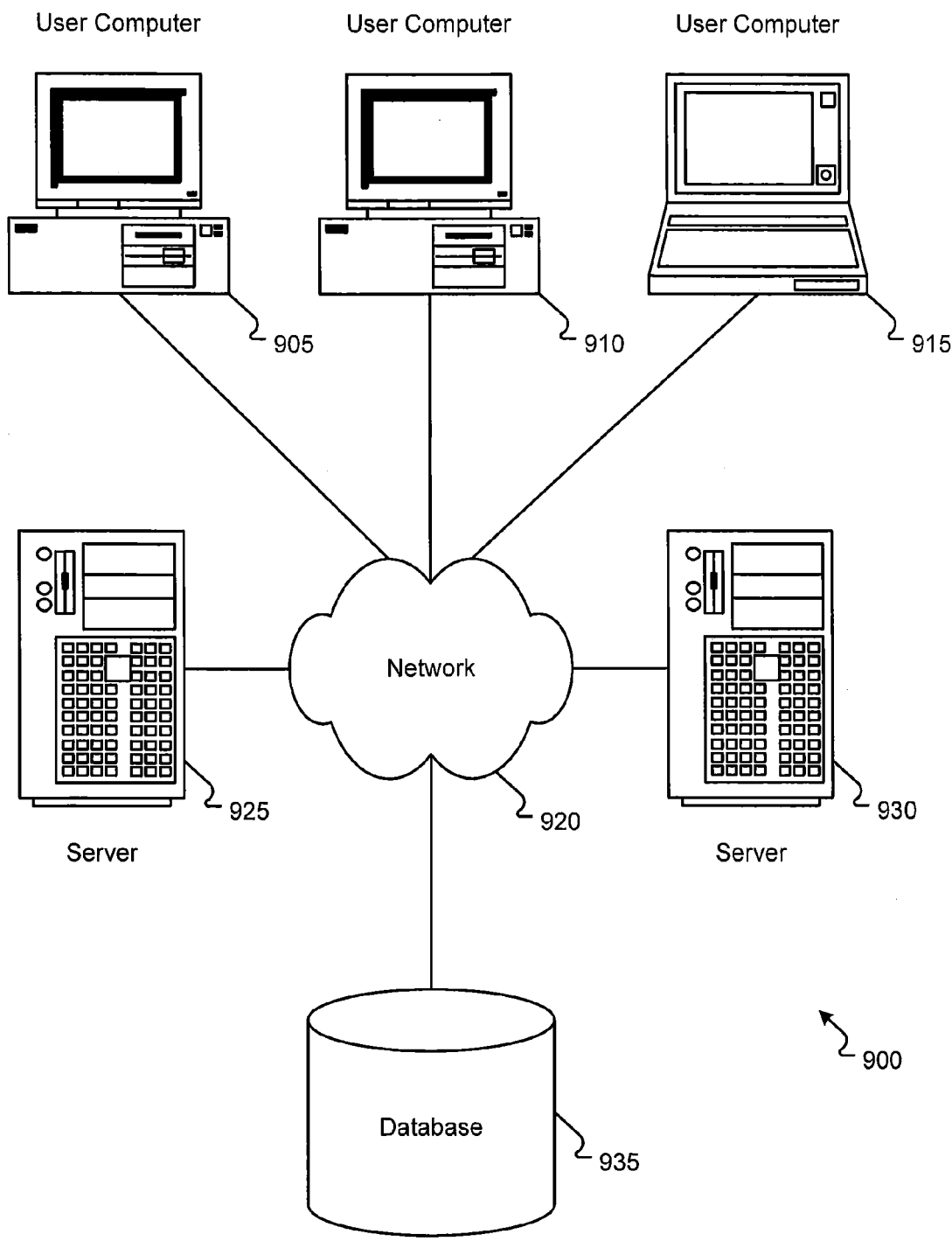
FIG. 9 is a block diagram of an embodiment of a computer system environment in which the systems and methods may be executed.

FIG. 9 illustrates a block diagram of a computing environment 900 that may function as system 100 to administer bandwidth. The system 900 includes one or more user computers 905, 910, and 915. The user computers 905, 910, and 915 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 905, 910, 915 may also have any of a variety of applications, including for example, database client and/or server applications, and web browser applications. Alternatively, the user computers 905, 910, and 915 may be any other electronic device, such as a thin-client computer, Internet-enabled mobile telephone, and/or personal digital assistant, capable of communicating via a network (e.g., the network 920 described below) and/or displaying and navigating web pages or other types of electronic documents. Although the exemplary system 900 is shown with three user computers, any number of user computers may be supported.

System 900 further includes a network 920. The network 920 can be any type of network familiar to those skilled in the art that can support data communications using any of a variety of commercially-available protocols, including, without limitation, TCP/IP, SNA, IPX, AppleTalk, and the like. Merely by way of example, the network 920 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 902.11 suite of protocols, the Bluetooth™ protocol known in the art, and/or any other wireless protocol); and/or any combination of these and/or other networks. The network 920 may be the same or similar to networks 114, 116, and/or 118.

The system 900 may also include one or more server computers 925, 930. One server may be a web server 925, which may be used to process requests for web pages or other electronic documents from user computers 905, 910, and 915. The web server can be running an operating system including any of those discussed above, as well as any commercially-available server operating systems. The web server 925 can also run a variety of server applications, including HTTP servers, FTP servers, CGI servers, database servers, Java servers, and the like. In some instances, the web server 925 may publish operations available operations as one or more web services.

The system 900 may also include one or more file and or/application servers 930, which can, in addition to an operating system, include one or more applications accessible by a client running on one or more of the user computers 905, 910, 915. The server(s) 930 may be one or more general purpose computers capable of executing programs or scripts in response to the user computers 905, 910 and 915. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 930 may also include database servers, including without limitation those commercially available from Oracle, Microsoft, Sybase™, IBM™ and the like, which can process requests from database clients running on a user computer 905.

The web pages created by the web application server 930 may be forwarded to a user computer 905 via a web server 925. Similarly, the web server 925 may be able to receive web page requests, web services invocations, and/or input data from a user computer 905 and can forward the web page requests and/or input data to the web application server 930. In further embodiments, the server 930 may function as a file server. Although for ease of description, FIG. 9 illustrates a separate web server 925 and file/application server 930, those skilled in the art will recognize that the functions described with respect to servers 925, 930 may be performed by a single server and/or a plurality of specialized servers, depending on implementation-specific needs and parameters. The computer systems 905, 910, and 915, file server 925 and/or application server 930 may function as servers 102, 104, and/or 106 or other systems described herein.

The system 900 may also include a database 935, which may be the same or similar to database 230, 302, or 309. The database 935 may reside in a variety of locations. By way of example, database 935 may reside on a storage medium local to (and/or resident in) one or more of the computers 905, 910, 915, 925, 930. Alternatively, it may be remote from any or all of the computers 905, 910, 915, 925, 930, and in communication (e.g., via the network 920) with one or more of these. In a particular set of embodiments, the database 935 may reside in a storage-area network ("SAN") familiar to those skilled in the art. Similarly, any necessary files for performing the functions attributed to the computers 905, 910, 915, 925, 930 may be stored locally on the respective computer and/or remotely, as appropriate. In one set of embodiments, the database 935 may be a relational database, such as Oracle 10i™, that is adapted to store, update, and retrieve data in response to SQL-formatted commands. Database 935 may be the same or similar to the database used to store the control table 204.

Figure 10:
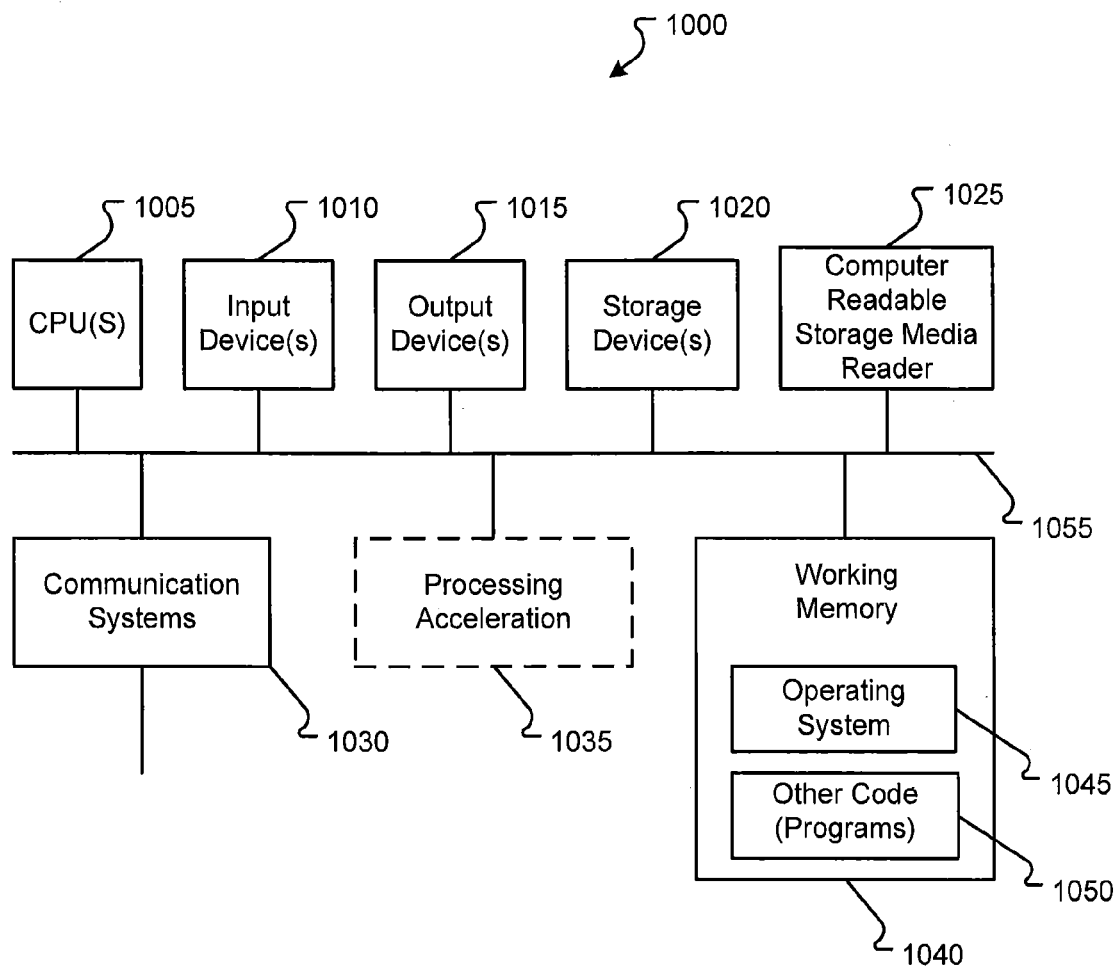
FIG. 10 is a block diagram of a computer system in which the systems and methods may be executed.

FIG. 10 illustrates one embodiment of a computer system 1000 upon which servers 102, 104, and/or 106 or other systems described herein may be deployed or executed. The computer system 1000 is shown comprising hardware elements that may be electrically coupled via a bus 1055. The hardware elements may include one or more central processing units (CPUs) 1005; one or more input devices 1010 (e.g., a mouse, a keyboard, etc.); and one or more output devices 1015 (e.g., a display device, a printer, etc.). The computer system 1000 may also include one or more storage device 1020. By way of example, storage device(s) 1020 may be disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1025; a communications system 1030 (e.g., a modem, a network card (wireless or wired), an infra-red communication device, etc.); and working memory 1040, which may include RAM and ROM devices as described above. In some embodiments, the computer system 1000 may also include a processing acceleration unit 1035, which can include a DSP, a special-purpose processor and/or the like.

The computer-readable storage media reader 1025 can further be connected to a computer-readable storage medium, together (and, optionally, in combination with storage device (s) 1020) comprehensively representing remote, local, fixed, and/or removable storage devices plus storage media for temporarily and/or more permanently containing computer-readable information. The communications system 1030 may permit data to be exchanged with the network 1020 and/or any other computer described above with respect to the system 1000. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 1000 may also comprise software elements, shown as being currently located within a working memory 1040, including an operating system 1045 and/or other code 1050, such as program code implementing the server 300. It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for administering telephone calls, comprising:
a first call processing server receiving a stimulus, wherein the first call processing server is a member of a group of distributed call processing servers that administer telephone calls in an enterprise network;
in response to the stimulus, determining if another call processing server is active in the group;
if another call processing server is not active, setting an allotted bandwidth for the first call processing server equal to an administered bandwidth, wherein the administered bandwidth is a total bandwidth for the network; and
if another call processing server is active, the first call processing server receiving, from another call processing server in the group, an allotment of bandwidth.

2. The method as defined in claim 1, further comprising, if another call processing server is not active, setting the first call processing server as an administrator for the group of distributed call processing servers.

3. The method as defined in claim 2, further comprising:
the administrator receiving a request for an initial bandwidth allotment from a second call processing server;
the first call processing server determining if the first call processing server can give a bandwidth allotment;
if the first call processing server can give a bandwidth allotment, the first call processing server determining how much bandwidth to give;
the call first processing server giving the determined bandwidth to the second call processing server as the bandwidth allotment; and
if the first call processing server cannot give the bandwidth allotment, the first call processing server denying the request from the second call processing server.

4. The method as defined in claim 3, wherein determining if the first call processing server can give a bandwidth allotment comprises:
the first call processing server determining a minimum bandwidth the server needs to keep (minK), a maximum bandwidth to give (MaxG), and an available bandwidth;
the first call processing server determining if the available bandwidth is greater than the maximum bandwidth to give (MaxG);
if the available bandwidth is greater than the MaxG, the first call processing server giving MaxG as the bandwidth allotment;
if the available bandwidth is not greater than MaxG, the first call processing server determining if the available bandwidth is greater than minK;
if the available bandwidth is greater than minK, the first call processing server giving the bandwidth allotment of the available bandwidth less minK; and
if the available bandwidth is not greater than minK, the first call processing server denying the request.

5. The method as defined in claim 2, further comprising:
the administrator initiating an audit;
the administrator asking each call processing server in the group of distributed call processing servers for the first call processing server's used bandwidth and allotted bandwidth;
the administrator determining if a sum of the allotted bandwidths of all call processing servers in the group of call processing servers equals the administered bandwidth;
if the sum of the allotted bandwidths of all the call processing servers in the group of call processing servers equals the administered bandwidth, the administrator stopping the audit;
if the sum of the allotted bandwidths of all the call processing servers in the group of call processing servers does not equal the administered bandwidth, the administrator determining a difference between the allotted bandwidths of all the call processing servers in the group of call processing servers and the administered bandwidth;

the administrator determining an amount of bandwidth to change for at least one call processing server; and the administrator sending, to the at least one call processing server, a new allotment for the at least one call processing server.

6. The method as defined in claim 1, wherein the first call processing server sets the allotment of bandwidth as allotted bandwidth in a control table.

7. The method as defined in claim 6, further comprising:
the first call processing server receiving an incoming call;
the first call processing server determining if a sum of a bandwidth for the incoming call and a value for used bandwidth is less than the allotted bandwidth in the control table;
if the sum of the bandwidth for the incoming call and the value for used bandwidth is less than the allotted bandwidth, the first call processing server allowing the incoming call;
if the sum of the bandwidth for the incoming call and the value for used bandwidth is greater than the allotted bandwidth, the first call processing server delaying the incoming call;
the first call processing server requesting more bandwidth from at least one member of the group;
the first call processing server determining if the received bandwidth is enough to allow the incoming call;
if the received bandwidth is enough to allow the incoming call, the first call processing server allowing the call; and
if the received bandwidth is not enough to allow the incoming call, denying the incoming call.

8. The method as defined in claim 7, further comprising:
a second call processing server receiving the request for bandwidth;
the second call processing server determining if allotted bandwidth is greater than used bandwidth for the second call processing server;
if allotted bandwidth is not greater than used bandwidth, the second call processing server giving no bandwidth to the first call processing server;
if allotted bandwidth is greater than used bandwidth, the second call processing server determining whether to give to a threshold amount;
if the second call processing server can give to a threshold amount, the second call processing server giving the requested bandwidth; and
if the second call processing server cannot give to the threshold amount, determining an amount of bandwidth to give; and
the second call processing server giving the determined amount.

9. The method as defined in claim 8, wherein determining whether to give to a threshold amount comprises determining if a sum of requested amount of bandwidth and the used bandwidth is less than a low bandwidth threshold.

10. The method as defined in claim 9, wherein the low bandwidth threshold is less than the allotted bandwidth for the second call processing server.

11. The method as defined in claim 8, wherein determining an amount of bandwidth to give comprises subtracting the sum of used bandwidth and the requested amount of bandwidth from a low bandwidth threshold.

12. A system for administering calls comprising:
two or more branches, each branch including a caller;
two or more networks;
two or more call processing servers, wherein each of the two or more call processing servers communicates with a branch through a network, wherein each of the two or more call processing servers comprises:
a control table, the control table storing control information associated with bandwidth administration;
a first call processing server of the two or more call processing servers in communication with the control table, wherein each of the two or more call processing servers form a group to administer bandwidth for the system;
wherein the two or more call processing servers execute computer-executable instructions, the instructions comprising:
instructions to receive a stimulus;
in response to the stimulus, instructions to determine if another call processing server is active; and
if no other call processing server is active, instructions to set allotted bandwidth for the call processing server equal to the administered bandwidth, wherein the administered bandwidth is a total bandwidth for the network.

13. The server as defined in claim 12, wherein the control table includes dynamic control information.

14. The server as defined in claim 12, wherein the control table includes data fields for one or more of an administrator bit, a location, a maximum bandwidth allowed, an allotted bandwidth, a per call bandwidth, a currently used bandwidth, and a low bandwidth threshold.

15. The server as defined in claim 12, further comprising:
instructions to set the one of the two or more call processing servers as an administrator for the group of call processing servers;
if another call processing server is active, instructions to request to join the group;
instructions to request bandwidth from another call processing server; and
instructions to receive an allotment of bandwidth.

16. A non-transitory computer program product including computer executable instructions stored onto a computer readable medium which, when executed by a processor of a computer, causes the computer to perform a method for requesting more bandwidth from another member of a group of call processing servers, the instructions comprising:
instructions to receive an incoming call;
instructions to determine if a sum of a bandwidth for the incoming call and a value for used bandwidth is greater than a value for allotted bandwidth in a control table;
if the sum of the bandwidth for the incoming call and the value for used bandwidth is not greater than the allotted bandwidth, instructions to allow the incoming call;
if the sum of the bandwidth for the incoming call and the value for used bandwidth is greater than the allotted bandwidth, instructions to delay the incoming call;
instructions to request more bandwidth from at least one member of the group of the call processing servers;
instructions to determine if the received bandwidth is enough to allow the incoming call;
if the received bandwidth is enough to allow the incoming call, instructions to allow the call;
if the received bandwidth is not enough to allow the incoming call, instructions to deny the incoming call;
instructions to receive a stimulus;
in response to the stimulus, instructions to determine if another call processing server is active; and
if no other call processing server is active, instructions to set allotted bandwidth for the call processing server equal to the administered bandwidth, wherein the administered bandwidth is a total bandwidth for the network.

17. The computer program product as defined in claim 16, further comprising:

instructions to receive a request for bandwidth;

instructions to determine if the allotted bandwidth is greater than used bandwidth;

if allotted bandwidth is not greater than used bandwidth, instructions to give no bandwidth;

if allotted bandwidth is greater than used bandwidth, instructions to determine whether to give to a threshold amount;

if a first call processing server of the group of call processing servers can give the threshold amount, instructions to give the requested bandwidth;

if the first call processing server cannot give to the threshold amount, instructions to determine an amount of bandwidth to give; and instructions to give the determined amount.

18. The computer program product as defined in claim 17, wherein determining whether to give to a threshold amount comprises determining if a sum of requested amount of bandwidth and the used bandwidth is less than a low bandwidth threshold.

19. The computer program product as defined in claim 18, wherein the low bandwidth threshold is less than the allotted bandwidth for a second call processing server.

20. The computer program product as defined in claim 17, wherein determining an amount of bandwidth to give comprises subtracting the sum of used bandwidth and the requested amount of bandwidth from a low bandwidth threshold.

* * * * *